Patented July 13, 1937

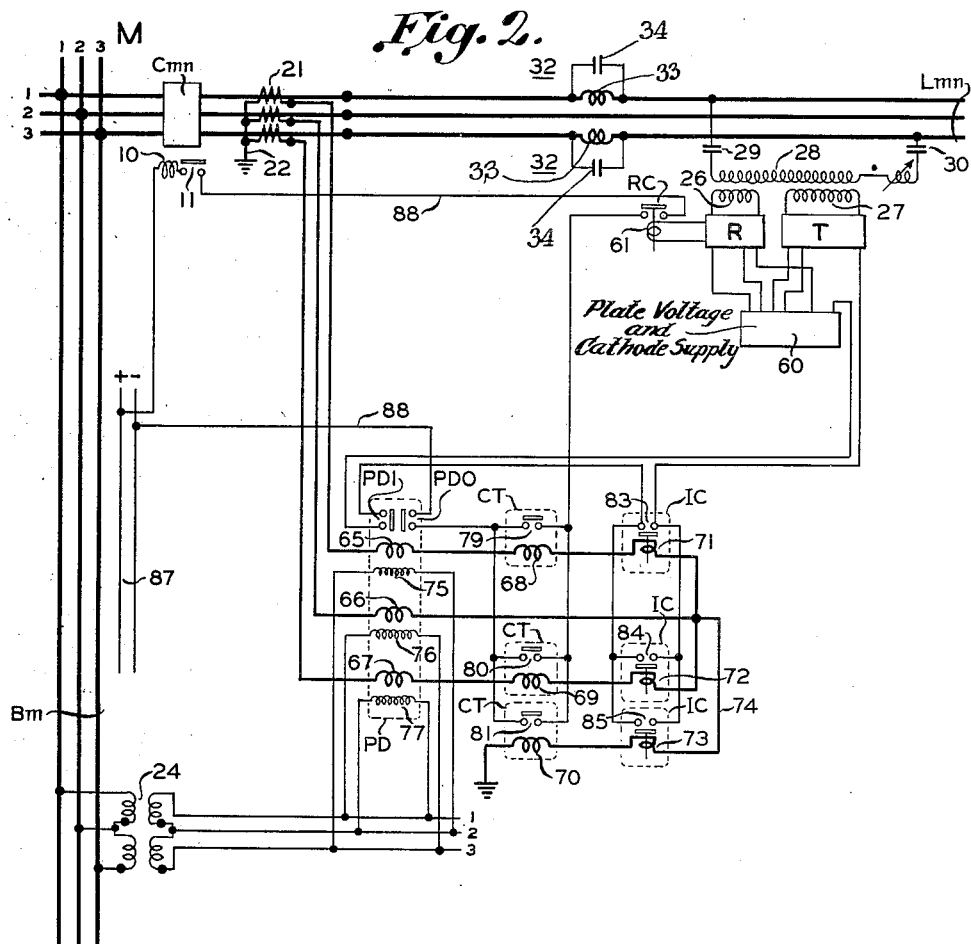

2,087,126

UNITED STATES PATENT OFFICE 2,087,126

PROTECTIVE SYSTEM FOR ELECTRIC POWER LINES

Philip Sporn, Brooklyn, and Charles Albert Muller, Tuckahoe, N. Y.

Application January 6, 1932, Serial No. 584,936

1 Claim. (Cl. 175—294)

This invention relates to protective systems for electric power lines, and it has among its objects an improved system utilizing carrier current transmitted over the power transmission line for controlling the tripping of the circuit breakers at the two switching stations or terminals of a line section so as to leave the line sections that are without fault in operation and cut out only the section of the line on which the fault occurs.

In accordance with the invention, each end of a protected section of a three phase electric power transmission is connected to the transmission line through interrupter means provided with a protective arrangement operative to open the interrupters on the occurrence of a fault in the event the fault occurs on the protected line section, but positively preventing the opening of the interrupters and the disconnection of the protected line section if the fault that occurred on the line is outside the protected section.

The protective arrangement of the invention secures quick and reliable disconnection of faulty line sections without causing line disturbances through false interrupter opening by effecting the opening of the line interrupter at each section end through the action of line energized fault responsive relay means having at least two actuating elements individually energized by currents from different line phases, the opening operation being subjected to an opening restraining action of a carrier transmitter at the other section end controlled by power directional relay means having a plurality of actuating elements individually energized by line currents and voltages corresponding to the currents and voltages of the different line phases in accordance with the direction of the resultant power flow in the line for selectively preventing the opening of the interrupter upon the occurrence of a fault if the fault is outside the line section; and this positive selective protection of the line section is secured with simple well known conventional transmission line relays having an established record of reliability.

The foregoing and other objects of the invention will be best understood from the following description of exemplifications thereof, reference being had to the accompanying drawing, wherein Fig. 1 is a diagrammatic view of a portion of an electric power transmission system to which the invention is applied; and Fig. 2 is a diagrammatic view of the protective arrangement at the individual stations of the protected sections of the system embodying one form of the invention.

One of the greatest difficulties encountered in the operation of electric power supply systems is the maintenance of the continuity of service to the consumers connected to the systems, and utmost efforts are made to localize faults on the transmission lines and to reduce to a minimum the effect of such faults on the remainder of the system. Modern electric power transmission systems usually consist of large interconnected transmission and distribution lines extending between stations distributed over the area that is to be supplied, a typical portion of such system interconnecting two adjacent stations M and N being shown in Fig. 1. At each of the two stations, there is a set of high voltage bus-bars $Bm$ and $Bn$. Two incoming high tension transmission line sections $Lmx$ and $Lmz$, each comprising three-phase high voltage conductors 1, 2 and 3 are connected through circuit breakers $Cmx$ and $Cmz$ to the bus-bars $Bm$ of station M; a transmission line $Lmn$ also composed of three phase conductors extends between stations M and N and is connected to the bus-bar conductors $Bm$ and $Bn$ of said stations through circuit breakers $Cmn$ and $Cnm$; and a transmission line section $Lno$ leading to further stations of the transmission system is connected through a circuit breaker $Cno$ to the bus-bars $Bn$ of station N. In this way, the transmission lines of the entire system are, as a rule, sectionalized, the individual sections being arranged to be independently cut off from the system by the circuit breakers which connect their ends to the bus-bars of their terminating stations.

It is impossible to entirely eliminate accidents and damage to the transmission lines running over the country, but damage from such accidents could be reduced to a very small amount and made negligible if the transmission line system could be so protected as to cause only the faulty line section to be cut out upon the occurrence of a short circuit or similar fault on a section, leaving the other transmission line sections connected and in operative condition notwithstanding the fault.

For many years past the large electric power transmission and distribution systems with loop and network lines were handicapped in their operation and development because of the lack of a satisfactory protective system for securing positive cutting out of a faulty line section on the occurrence of a fault without disturbing the operation over the intact line sections of the system. This condition continued for many years although the art knew of various schemes which in theory, and to some extent in tests, had promised to give the desired protection.

To be effective a protective arrangement for such power transmission line systems must be able to clear a faulty section quickly and with 100% reliability in order to prevent the large short-circuit capacity of such power systems from pumping power into the fault and thus endanger not only the faulty section but the entire power supply. At the same time the protective system must positively eliminate false tripping of sound line sections as otherwise the protective system would itself become a source of the very trouble which it is required to eliminate.

The theoretically best protective system so far proposed is the pilot wire protection system controlling the operation of the circuit breakers at the stations by separate pilot wires extending between the stations and arranged to respond to the differential action of the currents at the stations. Although this pilot system of protection has so far been considered as theoretically most perfect, there was very small practical use made of it, and most of the present day transmission lines still remain without the high degree of selective protection that such system could theoretically give. An important deterring reason against the adoption of the pilot wire protection system is its high cost and its complications. But even more important is its lack of reliability in emergencies when it is needed most because the pilot wires very often become damaged and out of order at the very time when the trouble occurs on the transmission line so that the very element which is relied upon for protection in case of trouble is in itself inoperative at the crucial moment.

Experience has shown that carrier current communication systems operating with high frequencies of the order of 50 to 150 thousand cycles per second over power transmission and distribution lines constitute one of the most reliable means for maintaining continuous communication between the stations of the system under all normal and emergency conditions. In fact, it has been proven that even in cases where all other wire communication systems such as the telegraph and the telephone has, by reason of atmospheric conditions, gotten out of order, the carrier communication between power stations over power transmission lines could be maintained notwithstanding the damaged condition of the interconnecting power lines. This is due to the fact that high voltage transmission lines are built more ruggedly and with much greater care than other types of wire lines, and that accordingly the relative damage to such power transmission lines is smaller than that done to other wire lines extending in the affected territory, under atmospheric or other disturbances.

In view of the special reliability of the carrier communication over power transmission lines, many efforts have been made in the past to adapt carrier currents for securing selective protection of the power transmission lines, but the systems proposed so far were not only too cumbersome and expensive for practical application but, what is more important, they were inherently unsatisfactory and unreliable because their action depended on devices and arrangements which operated with critical marginal characteristics and instead of reducing the disturbing effects of line faults actually increased the line disturbances.

Our present invention provides an improved system of protection for power transmission line systems, and secures positive cutting out of the faulty section while maintaining connected the sound sections of the line, by the use of carrier communication over the transmission lines for controlling the tripping action of the circuit breaker at one end of a line section in accordance with the direction of the power flow at the opposite station of the line section.

In accordance with the invention, the tripping of the circuit breaker at the station on each end of a line section is made to depend not only on the amount of current flowing in the line, but also on the actuation of the carrier communication apparatus at the station by carrier communication apparatus at the station on the other end of the line in accordance with the direction of power flow therein. The arrangement is such that the breakers at each station at the ends of a line section are not allowed to trip unless (a) the current at the station is of sufficient magnitude to indicate a fault; (b) the direction of the power flow is away from the bus into the line section and the power at the station on the other end of the line section is also away from the bus into the line section; and (c) the communication apparatus at the station is actuated by the communication apparatus at the other station in a way establishing that there is no flow of current from the line section into the busses at said other station.

In Fig. 2 is shown the protective relay equipment at the connection of the end of the transmission line section L$mn$ to the station bus-bars B$m$ of station M, an exactly alike equipment being also provided at the connection of the other end of the line section L$mn$ to the busses B$n$ at station N.

The circuit breaker C$mn$ connecting the three-line conductors 1, 2 and 3 of section L$mn$ to the busses B$m$ is of the usual type and ordinarily consists of three separate oil circuit breaker units arranged to be actuated in common. The circuit breaker has a tripping coil 10 which trips the breaker upon being energized, an auxiliary switch 11 being connected in series with the tripping coil and arranged to be opened with the circuit breaker to de-energize the tripping coil when the circuit breaker is open.

Mounted in the station is a power-directional relay PD arranged to be actuated to close its contacts PDI when the power flows in the direction from the bus-bars B$m$ through the circuit breaker C$mn$ into the line section L$mn$, and to close its contacts PDO in case the power flows in opposite direction out from the line section L$mn$ into the bus-bars B$m$. The power-directional relay PD as shown has three current coils 65, 66, 67, and three voltage coils 75, 76, 77, the three sets of voltage and current coils acting inductively on suitably mounted discs to turn them in one or the opposite direction, depending on the direction of the power flow corresponding to the currents and voltages applied to the actuating coils 65, 66, 67 and 75, 76, 77, respectively. Type IK polyphase, induction, power-directional relays of the General Electric Company may be used for this service.

There is provided also a set of three time-delay, over-current relays CT, with current coils 68, 69, 70 arranged to close the contacts 79, 80, 81, respectively, upon flow of a predetermined current in accordance with a predetermined time setting. These over-current relays may be, for instance, of the induction time-delay type in which an alternating current energizes a magnet with shaded poles to impart movement to a disc which controls the contact closure. Type IA relays of the General Electric Company are well suited for this service.

There is provided in addition a set of instantaneously acting relays IC, having actuating coils 71, 72, 73 arranged to close quickly the contacts 83, 84, 85, respectively, upon predetermined current flow. The instantaneously acting relays IC may be of the plunger type and constructed like the PQ plunger type relays of the General Electric Company.

To energize the current coils of the power-directional relay PD and the current relays CT and IC, there is provided a set of three current transformers 21, having the secondary windings connected in star, with the starpoint grounded at 22. The three current coils 65, 66, 67 of the power-directional relay PD are connected in the three-phase leads of the secondary transformer windings 21, while the coils 68, 69 of two time-delay current relays CT and the coils 71, 72 of two instantaneous current relays IC are connected in two-phase leads from the transformers, with the coils 70 and 73 of the third time-delay relay CT and the third instantaneous relay IC connected in the neutral grounded return lead 23 of the current transformers. The current transformers 21 are preferably made in the form of bushing current transformers in conjunction with the inlet bushings of the circuit breaker Cmn at the station, avoiding the use of separate instrument type current transformers.

The voltage coils 75, 76, 77 of the directional-power relay PD are suitably supplied from any ordinary potential transformers such as potential transformers 24, which has its high voltage side connected to the bus-bars Bm at the station. The phase sequence of the connections of the voltage coils is properly arranged with relation to the phases of the operating current coils of the power-directional relay PD to secure the proper directional action of the relay in response to the direction of the power flow between the line Lmn and the bus-bars Bm of the station.

There is further provided at the station a carrier communication apparatus including a receiving apparatus R and a transmitter T. The details of construction of the receiver and transmitter do not constitute the subject matter of the present invention. They may have any of the different forms well known in the art in connection with carrier frequency transmission and reception, such apparatus being, for instance, described in an article on "Carrier Communication over Transmission Lines" in the General Electric Review for December, 1926, pages 843 to 845, and in a paper by P. Sporn and R. H. Wolford entitled "Experience with Carrier Current Communication" which was presented before the American Institute of Electrical Engineers in December, 1929 and was printed in the publications of that institute. However, in the protective systems here described, the carrier oscillations are used in their simplest form without modulation.

The receiver has an input coil 26 and the transmitter has an output coil 27 coupled to coil 28 which is coupled through two capacitors 29 and 30 to two phases of the transmission line Lmn entering the station. The capacitors may have the form described in the paper of Sporn and Wolford referred to above, or be in the form of bushing capacitors as described in the copending application of P. Sporn and R. H. Wolford, Serial No. 476,978 filed August 22, 1930. An additional tuning coil 31 is connected in the coupling circuit to permit tuning of the circuit to a specific carrier frequency. Traps 32 composed of inductances 33 shunted by condensers 34 to constitute a high impedance to the carrier frequency of the communication apparatus are inserted into the end of the line phases to which the high frequency carrier communication apparatus is coupled to prevent the carrier currents of one section from affecting carrier apparatus in other sections.

The carrier frequency receiver R and transmitter T are of the type using three-electrode oscillation valves, the plate and cathode circuits of which are arranged to be supplied from a plate supply source 68 of familiar form.

The instantaneous relays IC have their parallel connected contacts 83 to 85 normally open and are closed only if the current in the line section Lmn has reached a predetermined value near the overload current at which the circuit breaker Cmn is to trip. For instance, the instantaneous current relays IC may be set to close when the current flow is 90% of the current for which the time-delay relays CT are to start the tripping of the circuit breaker Cmn. The contacts 83 to 85 of the instantaneous relays IC are connected in series with the transmitter anode supply lead to permit the transmitter to transmit when one of the instantaneous relays IC is actuated on the occurrence of a fault to close its contacts.

The receiver R has connected in its output circuit an actuating coil 61 of a receiver relay RC so that when no carrier frequency is received by the receiver, the coil 61 and the receiver relay RC are closed; and that when the receiver R receives carrier frequency energy, the current through coil 61 is sufficient to keep the receiver relay RC open.

The tripping coil 19 of the circuit breaker with its auxiliary switch 11 is supplied through a tripping circuit 88 leading from local, low-voltage, direct-current bus-bars 87 over the contacts PDO of the power directional relay PD by the three parallel connected contacts 79, 80, 81 of the over-current relays CT and the contacts of the receiver relay RC to cause tripping of the circuit breaker only after either one of the over-current relays CT has closed, and only if the receiver relay RC is closed and the contacts PDO of the power directional relay are closed. The tripping circuit 88 of the circuit breaker Cmn will therefore remain open notwithstanding the response of any of the over-current relays CT if the receiver R receives carrier energy and causes energization of the actuating coil 61 of the receiver relay RC, holding said relay open and interrupting the tripping circuit. However, the system will also operate satisfactorily if the contacts PDO on the power directional relay PD are entirely omitted and the tripping circuit is arranged to be completed only by the contacts of the current relays CT and the receiver relay RC.

The equipment shown in Fig. 2 is also provided at the station N, on the opposite end of the line section Lmn.

The operation of the system is as follows:

Let it be assumed that the transmission line sections are all intact and that most of the time there is a normal power flow along the transmission line from line sections Lmx and Lmz, by way of station M, through line section Lmn, through station N, into line section L$no$, and therethrough to other stations. The directional relays PD at both stations are so connected and arranged at both stations that for this condition of power flow in the line, the contacts 13 at both stations are open, that is, relay PD at station M is set to hold open contacts 13 for power flowing from busses B$m$ to line L$mn$ and to close contacts 13 for power flow from line L$mn$ to busses B$m$; and relay PD at station N is set to hold open contacts 13 for power flowing from L$mn$ into the busses B$n$ and to close for reverse power flow.

Under such conditions, the pole-changing switches 47 at both stations M and N will be in downward position, and set to apply to the transmitter T at station M and the receiver R at station N positive plate voltage during one-half cycle, and to apply to the transmitter T at station N and receiver R at station M positive plate voltage during the opposite half cycle. Closure of the instantaneous current switches IC at the two stations will then cause transmission of carrier energy from station M to station N during one-half cycle, and from station N to station M during the other half cycle, causing sufficient energization of the coils 51 of the receiver relays RC at both stations to hold said relays open and thus interrupting the tripping circuits 54 of the circuit breakers at both stations.

As long as the current flow in line L$mn$ is normal, the time-delay, over-current relays CT will have their contacts 17 open, interrupting the tripping circuits 54 of the circuit breakers at both stations and thus leaving the circuit breakers in closed position. The time-delay, over-current relays CT are so arranged and set that, upon the occurrence of a predetermined abnormal phase or ground current in the line, one of these relays CT starts to close its contacts 17, there being a time delay between the moment when this closing action is initiated and the moment when the contacts are closed. This time delay may be, for instance, 8 or 10 cycles.

If now a fault, such as a short circuit, occurs on the line section L$no$ beyond the station N, an abnormal current flow will ensue from the line section L$mx$ and L$mz$, through the line L$mn$, and the portion of the line section L$no$ leading from station N to the point of short circuit on L$no$. This abnormal current will immediately actuate the time-delay, over-current relays CT at each station, initiating their contact closure movement. The overload current also actuates one of the instantaneous current relays IC, closing its contacts 19, and establishing the supply circuits for the transmitter and receiver at each station. Since the power-directional relays PD at both stations are set to keep their contacts open, when power flows in the direction from the bus-bars B$m$ in station M to the bus-bars B$n$ in station N, the pole-reversing switches 47 stay de-energized, and carrier frequency is transmitted from station M to the receiver station N, and from station N to the receiver station M, energizing the actuating coils 51 of the receiver relays RC and holding the tripping circuits 54 at both stations open. This radio communication is established before the closing movements of the actuated time-delay relay CT has reached its final closing position, and though the contacts of one of the relays CT are closed at the expiration of its time delay, no tripping of the circuit breaker operated by it will take place, because the receiver relays RC are holding the tripping circuits 54 open at both stations. The circuit breakers will thus remain closed, and line section L$mn$ will stay in the circuit notwithstanding the overload current flowing to the fault, leaving it to the section on which a short circuit occurred to clear itself from the transmission line.

Should, however, the fault, such as a short circuit, occur on line section L$mn$ between station M and N, the circuit breaker C$mn$ and C$nm$ will be automatically opened, and the line section L$mn$ will be promptly disconnected from the transmission line. This is brought about as follows:

If, on the occurrence of a short circuit on section L$mn$, the flow of power from section L$mn$ into bus B$n$ at station N will cease and, instead, power will flow in reverse direction, that is, from the busses B$n$ into the line section L$mn$, if generating capacity is connected to the line at station N or beyond. As a result of the reverse power flow at station N, the power-directional relay PD at the station will close its contacts 13, energizing the actuating coil 48 of the pole-reversing switch 47. This shifts the sequence of the actuation of the transmitter T and receiver R at station M against its previous condition by half a cycle so that now transmitter T at station N transmits when the receiver R at station M is out of operation, and transmitter T at station M transmits when the receiver R at station N is out of operation. The carrier communication between the two stations is thus interrupted even if the instantaneous relays IC at both stations have closed the supply circuits of the receivers and transmitters due to abnormal current flow. Since the receiver relays RC at the two stations now do not receive carrier energy, the receiver switches RC at both stations remain closed, and upon completion of the closing movement by the time-delay relay CT actuated by the abnormal current to the fault, the tripping circuits 54 for circuit breakers C$mn$ and C$nm$ at both stations will be completed and both circuit breakers tripped.

By making the over-time relays CT relatively slow acting compared with the power-directional relays PD and the instantaneous current relays IC, the closure and opening of receiver switch RC controlled by the carrier communication apparatus over to the transmission line will be completed before the over-current relays CT have reached their tripping position on occurrence of an overload.

The second contact set PDI of the power-directional relay PD is included in series with the three parallel connected contact sets 83 to 85 of the instantaneously acting relays IC, so that only upon simultaneous closure of the contacts PDI of the power-directional relay PD and of one of the contact sets of the three instantaneous current relays IC will the transmitter plate-supply circuits be closed, and the transmitter T set to transmit carrier energy into the power transmission line L$mn$.

The power-directional relay PD is arranged to be quickly acting in comparison with the time-delay, over-current relays CT. For instance, the time-delay, over-current relays CT may be arranged to close their contacts about 10 cycles after the occurrence of an abnormal over-current, while the power-directional relay PD may be arranged to close its contacts instantaneously in response to the power flow between the bus and the line. The instantaneously acting relays IC are made to act fast compared to the time-delay, over-current relays CT, for instance, they may be arranged to close their contacts within two cycles after the occurrence of an abnormal current.

Through the arrangement of two time-delay, over-current relays CT and two instantaneously acting relays IC in two phase circuits of the current transformer, and of one time-delay, over-current relay CT and one instantaneous over-current relay IC in the neutral ground lead of the current transformer, actuation of at least one of the time-delay, over-current relays CT, and at least one of the instantaneous current relays IC, will be obtained either in case of an excessive current in a phase conductor or in case of an abnormal ground current, so that phase faults as well as ground faults will be safeguarded by these relays.

Each transmission line section that is to be protected is provided at its stations, such as M and N, with a set of protective apparatus as shown in Fig. 2. The protective system so arranged will operate as follows:

Let it be assumed that the transmission line is intact and there is a normal power flow in the direction from the station M, through the line section Lmn and station N, into line Lno, and therefrom to other stations. Under these conditions, the power-directional relay PD at station M will hold closed its contacts PDO, thus preparing the tripping circuit for the circuit breaker Cmn, but no tripping will occur since the contacts of the three time-delay, over-current relays CT are open, there being only a normal current flow. At station N the power flows from the line into the bus-bars Bn and there the circuit breaker tripping circuits will be opened not only at the time-delay, over-current relays CT, but also at the open contacts PDO of the power-directional relay PD, since in station N the power flows into the bus-bars, causing the power relay PD to close the contacts PDI, preparing the energizing circuit 89 for the transmitter T. However, the transmitter energizing circuit 89 is still open because the serially included contacts of the three instantaneous over-current relays IC are open, thus interrupting the circuit as long as the current flow is normal.

If now a fault, such as short circuit or ground fault, occurs in the transmission line section Lno beyond station N, causing a flow of abnormal current from station M to station N and therefrom to the point of fault on the line section Lno, the following action will take place:

The time-delay, over-current relays CT of the affected phases at station M will start closing the contacts, but because of the time-delay setting, the closure will not be effected until after about 10 cycles. Because the power flows from the busses Bm into the line Lmn, the power-directional relay PD has its contacts PDO closed. At the moment of the occurrence of the abnormal current flow, the receiver relay RC is closed so that without further action the circuit breakers Cmn would trip after one of the time-delay, over-current relays CT that is actuated by the over-current closes its contacts within about 10 cycles after the occurrence of the fault. The transmitter T at station M remains inoperative, since its actuating circuit is open at the contacts PDI of the power-directional relay notwithstanding the closure of one of the instantaneous current relays IC.

While this is going on at station M, the power-directional relay PD at station N has its contacts PDI closed, thereby holding ready the energization circuit for the transmitter T. The flow of the abnormal current through one of the instantaneous current relays IC at the station causes it to quickly close the contacts, say within a cycle or two after the occurrence of the fault, completing the energizing circuit for the transmitter T at station N and starting its operation. The transmission of carrier energy by the transmitter which has thus been started brings about an inflow of carrier energy into the receiver R at station M and the consequent energization of the actuating coil 61 of the receiver relay RC, opening the contacts of the relay and interrupting the tripping circuit 10 of the circuit breakers Cmn at station M. Since the transmission of the carrier current is started quickly upon occurrence of the fault, the tripping circuit 10 of the circuit breakers Cmn at station M will be opened long before the time-delay, over-current relays at station M, set for a time delay of about 10 cycles, have come to their closed position, so that the closure of the contacts of these relays, occurring subsequently to the opening of the contacts at the receiver switch RC, will not cause the breaker Cmn to trip. The breaker Cmn will remain closed, keeping the transmission line Lmn connected to the system.

At station N the circuit breaker tripping circuit is likewise de-energized, because the power-directional relay PD at station N, being actuated by power flow from the line into the bus, holds the contacts PDO of the tripping circuit open. The transmission line section Lmn will thus also remain connected to the bus-bars at station N so that the entire line section will stay intact in the transmission system notwithstanding the flow of abnormal current to the point of the fault outside of the section.

The protective system comes, however, immediately into action and cuts out the line section Lmn by opening the circuit breakers Cmn and Cnm at its two ends, if a fault occurs within the section Lmn. Power flows then at both stations M and N from the bus-bars into the line Lmn. The connections at station M remain now the same as in the case of a fault beyond station N considered before, that is, power-directional relay PD will close contacts PDO preparing the circuit breaker tripping circuit; the receiver switch RC will likewise hold its contacts closed waiting for actuation by carrier energy from the transmitter of station N; the transmitter supply circuit is open at the contacts PDI of directional relay PD; and one or the other of the time-delay, over-current relays CT will have been started by the abnormal current flow to move to its tripping position.

At the station N, the conditions have, however, changed as compared with the case where the fault was lying beyond station N. Assuming that generator capacity is available at station N or beyond, the power will now flow from the bus-bars Bn in station N toward the fault in line section Lmn, causing the power-directional relay PD at station M to close its contacts PDO, preparing the tripping circuit for the circuit breaker Cnm at station N, and opening the contacts PDI of the transmitter plate supply circuit. The receiver relay RC remains closed, the receiver not receiving energy from station M, and one or the other of the over-current relays CT at station N likewise starts on its tripping action. Since the transmitters at both stations have their plate supply circuits open, no carrier frequency is sent from either station to the other, and the receiver switches RC in both stations remain closed so that the over-current relays CT at the two stations cause tripping of the two circuit breakers at the ends of their time-delay periods, cutting off only the section with the fault from the transmission system, leaving the remainder operative and intact.

In case of a fault on section L*mn*, the arrangement will also open the circuit breaker C*mn* and disconnect the section L*mn* at station M if generating capacity is available only on the side of station M of line L*mn* and there is none on the side of station N. In such case directional relay PD at station N will hold open the transmitter supply circuit at its contacts PDI, this supply circuit being also open at the contacts of the instantaneous current relays IC. There will thus not be transmission of carrier current from station N, and the receiver relay RC at station M will stay closed, permitting the time relays at station M to trip circuit breaker C*mn*.

The protective system described above will operate in a similar way for power flow conditions in the opposite direction.

The system will also clear itself from a faulty line section, if generating capacity is connected only to one side of the faulty section, with no generating capacity connected to the opposite side of the line. If on a system as shown in Fig. 1, a fault occurs on section L*mn*, and generating capacity is available only on the left side of the station N, the fault current flowing from busses B*m* at station M will actuate relays PD, CT and IC at the station and set in operation the carrier transmitter T and receiver R as before. However, at station N, no current, or only very little current, will flow from the busses B*n* into line L*mn* toward the fault, leaving the relays PD, CT and IC at station inactive, and keeping the supply circuit of the transmitter T and receiver R at station N open. No carrier current will be transmitted from station N, and none will be received at the receiver R in station M, so that the receiver relay RC at station will stay closed, permitting tripping of the circuit breaker C*mn* at station M by time-delay over-current relay CT in the station. For conditions of normal power flow through line L*mn*, the circuit breaker C*mn* at both stations M and N will always stay closed because the time-delay relays CT, as well as the instantaneous relays IC at both stations will be open, thus holding the tripping circuits at both stations open.

The protective system shown in Fig. 2 will give substantially the same fast protective action if the contacts PDO of the power directional relays PD at both stations are short-circuited or permanently bridged over under the omission of the contacts PDO so that the completion of the tripping circuit is effected only by the conjoint action of one of the set of parallel contacts 79, 80, 81 of the fault responsive relays CT and the contacts of the receiver relay RC.

By the combination of simple power-directional relays and a carrier transmission channel, the system of our invention thus provides in a very simple manner, and with minimum of relays and complications the highest type of protection for the injured portions of the transmission line, while at the same time holding all the portions of the transmission line system that are without fault intact and interconnected and able to continue service without interruption. The various apparatus used in the protective system of our invention are extremely simple and relatively inexpensive. Power-directional relays with simple potential and current transformers are universally used in most of the stations without giving the same a high degree of protection and effectiveness obtained by their use in accordance with our invention, so that the provision of our protective arrangement does not involve the use of any special and expensive apparatus complicating the station arrangement. By relying on carrier transmission over the power transmission lines, the degree of protection is immensely increased over any other system of pilot protection, thus assuring a much higher degree of safety and effectiveness.

If desired, the fast-acting relays IC in the arrangement of Fig. 2 may be also used to control the operation of the receivers so as to have the receivers de-energized under normal operating conditions when there is no abnormal current flow in the line, and to close only when there is abnormal current flow, causing one of the quick-acting relays IC to operate and close its contacts. To secure this additional control action, the quick-acting relays may have a second set of contacts included in series with the energizing circuit of the receiver at the station, or any other suitable arrangement.

In the protective system of the invention described above, the protective action depends on the operation of simple relays of standard construction long known and used for the protection of transmission lines. Its selective operation requires carrier current equipment in its most elementary form. All types of faults at any location in any type of system are rapidly cleared so that the benefits of the line equipment may be fully realized. It enables the system planner or operator to run the line with loops or with taps and obtain the same selective relaying which has heretofore been possible only with much more complicated forms of protection. The use of the protective system of the invention makes also possible greater flexibility in power system planning and operation, assures increased stability, less damage and hazard, and minimizes voltage disturbances. It can be applied to transmission lines with a minimum of system analysis because it does not need to be time-coordinated with relaying apparatus on adjacent line sections. For the same reason, system changes or extensions seldom necessitate modifications of the protection of lines equipped with such carrier relaying. The tripping of the circuit interrupters is determined solely by the operation of standard reliable local relays at each station and does not depend on the phase relationship of the line currents or the modulation of the carrier currents. At the same time the power directional relay does its own blocking when power flows from the line to the bus independent of the action of the carrier transmitters and receivers. The oscillator and receiver tubes and the carrier apparatus are not exposed to over-voltage due to heavy fault currents. The protective system may be installed on any section of the line without detrimentally affecting any other section of the transmission line system and without being in any way detrimentally affected by any other sections of the system.

The selective action of the directional relaying means in effecting conjoint control of the carrier transmitter as well as the local trip circuit to block tripping of the interrupter independently of the action of the carrier if the power flows out of the section end is disclosed in, and constitutes the subject matter of claims of our copending application, Serial No. 716,798, filed March 22, 1934, as a continuation in part of the present application.

The invention is not limited to the details and forms of arrangement described hereinabove, as many modifications and variations thereof will suggest themselves to those skilled in the art. It is accordingly desired that the appended claim be given a broad construction commensurate with the scope of the invention.

We claim as our invention:—

In a protective system for a section of a high voltage three-phase electric power transmission line system extending between two remote generating stations having line interrupting means at each section end including tripping means for tripping said interrupting means to disconnect the section from the line upon actuation of said tripping means, transforming means at each section end connected to said line for supplying transformed currents and voltages corresponding in magnitude and phase to the currents and voltages of the three line phases, fault-responsive time action relay means at one section end having at least two relay actuating elements individually connected through said transforming means to different line phases and individually energized by currents from different line phases flowing in the three line phases for actuating said tripping means upon occurrence of a fault on said line, a carrier oscillation transmitter at the other section end, a carrier oscillation receiver at said one section end tuned to the frequency of said transmitter, power directional relay means at said other section end having three relay driving elements individually connected through said transforming means to the different line phases and individually energized by line currents and voltages corresponding in magnitude and phase to the currents and voltages of the three different line phases for selectively controlling the operation of said transmitter in accordance with direction of the resultant power flow in the three line phases, and means controlled by said carrier oscillation receiver and operative before the actuation of said tripping means is effected by the action of said fault-responsive relay means to prevent the actuation of said tripping means by the action of said fault-responsive relay means upon occurrence of a fault outside said line section.

PHILIP SPORN.
CHARLES ALBERT MULLER.